United States Patent
Boere et al.

(10) Patent No.: US 11,877,904 B2
(45) Date of Patent: Jan. 23, 2024

(54) DRIVETRAIN ASSEMBLY FOR A PERSONAL CARE DEVICE

(71) Applicant: KONINKLIJKE PHILIPS N.V., Eindhoven (NL)

(72) Inventors: Stijn Willem Boere, Eindhoven (NL); Jan Willem Bruggers, Horst (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/058,789

(22) PCT Filed: May 28, 2019

(86) PCT No.: PCT/EP2019/063705
§ 371 (c)(1),
(2) Date: Nov. 25, 2020

(87) PCT Pub. No.: WO2019/229009
PCT Pub. Date: Dec. 5, 2019

(65) Prior Publication Data
US 2021/0196439 A1    Jul. 1, 2021

Related U.S. Application Data

(60) Provisional application No. 62/678,310, filed on May 31, 2018.

(51) Int. Cl.
*A61C 17/34*    (2006.01)
*A61C 17/22*    (2006.01)

(52) U.S. Cl.
CPC ............ *A61C 17/34* (2013.01); *A61C 17/221* (2013.01)

(58) Field of Classification Search
CPC ..... A61C 17/34; A61C 17/221; A61C 17/224; H02K 7/14; H02K 33/00
USPC ............................................. 15/22.1; 310/50
See application file for complete search history.

(56) References Cited

U.S. PATENT DOCUMENTS

| | | | |
|---|---|---|---|
| 5,378,153 A | | 1/1995 | Giuliani et al. |
| 2003/0204924 A1 | | 11/2003 | Grez et al. |
| 2011/0214239 A1 | * | 9/2011 | Kagami ............... A61C 17/34 15/22.1 |
| 2016/0166367 A1 | | 6/2016 | Kleppen |
| 2017/0020641 A1 | * | 1/2017 | Kleppen ............... H02K 7/14 |

(Continued)

FOREIGN PATENT DOCUMENTS

| | | |
|---|---|---|
| RU | 2329752 C2 | 7/2008 |
| RU | 2609397 C2 | 2/2017 |

(Continued)

OTHER PUBLICATIONS

International Search Report and Written Opinion, International Application No. PCTEP2019/063705, dated Aug. 14, 2019.

*Primary Examiner* — Katina N. Henson

(57) ABSTRACT

According to an aspect there is provided a drivetrain assembly (1) for a personal care device (10). The drivetrain assembly (1) comprising: a shaft (2); a frame (4) comprising an opening in a surface (4a) of the frame (4) through which the shaft (2) extends; and an abutment (3) provided in cooperation with the shaft (2). An engagement surface (3a) of the abutment (3) is configured to engage with the surface (4a) of the frame (4) such that relative movement between the frame (4) and the shaft (2) in a given direction (d) is inhibited past a threshold distance.

12 Claims, 11 Drawing Sheets

(56) References Cited

U.S. PATENT DOCUMENTS

2018/0087631 A1 3/2018 Kramp et al.
2018/0087632 A1 3/2018 Fritsch et al.

FOREIGN PATENT DOCUMENTS

| RU | 2675295 | C2 | 12/2018 |
|----|---------|----|---------|
| WO | 1996010373 | A1 | 4/1996 |
| WO | 2012020388 | A1 | 2/2012 |
| WO | 2016193348 | A1 | 12/2016 |

* cited by examiner

DRIVETRAIN ASSEMBLY FOR A PERSONAL CARE DEVICE

This application is the U.S. National Phase application under 35 U.S.C. § 371 of International Application No. PCT/EP2019/063705, filed on 28 May 2019, which claims the benefit of U.S. Provisional Application No. 62/678,310, filed 31 May 2018. These applications are hereby incorporated by reference herein.

TECHNICAL FIELD

Embodiments of the present invention relate generally to motors for personal care devices, such as, for example, power toothbrushes, power shavers and skin care devices.

BACKGROUND

A drivetrain in a personal care device is an electromagnetic module which creates the necessary movements of the device. In a power toothbrush, the drivetrain creates the oscillatory movements of the brush head. The drivetrain comprises a motor, which includes a rotor and a stator, and a shaft (output shaft, drive shaft).

Personal care devices, such as power toothbrushes, are generally sensitive to drop events, i.e. to being dropped by a user or knocked from a countertop or similar elevated surface. A scenario which may be particularly damaging to a personal care device is when the personal care device is dropped onto a ceramic floor (or similarly hard surface) and the shaft of the drivetrain directly impacts the ceramic floor. In this case, the drop forces applied to the shaft may be up to several kN, which may severely damage the personal care device.

As stated above, the shaft is provided as part of the drivetrain and the drivetrain of the personal care device is sensitive to drop forces such that the drivetrain may fail as a result of an axial drop on the shaft.

It is desirable to provide personal care devices, such as power toothbrushes, with drop protection.

SUMMARY

According to an embodiment of a first aspect, there is provided a drivetrain assembly for a personal care device, the drivetrain assembly comprising: a shaft; a frame comprising an opening in a surface of the frame through which the shaft extends; and an abutment provided in cooperation with the shaft, wherein an engagement surface of the abutment is configured to engage with the surface of the frame such that relative movement between the frame and the shaft in a given direction is inhibited past a threshold distance.

Thus, according to embodiments of the present invention, the abutment is provided to engage with the frame of the drivetrain such that movement of the shaft relative to the frame is inhibited (impeded, hindered or obstructed). That is, the abutment is provided at a position on the shaft which allows the shaft to move in the given direction up to a certain point (a threshold distance) at which the abutment engages with the frame to prevent/inhibit the shaft from moving further. More specifically, an engagement surface of the abutment engages with the surface of the frame through which the shaft extends.

The abutment therefore provides a drop protection element that protects the vulnerable elements of the drivetrain by redirecting the path of a force applied to the shaft, which causes the shaft to move in the given direction, away from the vulnerable/sensitive elements of the drivetrain. The path of the force is instead redirected through the frame by engagement of the abutment with the surface of the frame once the shaft has moved a threshold distance. Since the path of a force applied to the shaft is redirected away from the sensitive components of the drivetrain, failure of the components is less likely to occur in the event that the personal care device is dropped. The threshold distance may therefore be considered as a distance that the shaft is permitted to move before the path of the force is to be redirected through the frame, via the abutment. The threshold distance may, for example, be 0.2 mm (+/−0.05 mm). The path through the frame may be considered as a robust path which bypasses the vulnerable components of the drivetrain.

As stated above, the abutment abuts against the frame to inhibit movement of the shaft past the threshold distance. More specifically, the engagement surface of the abutment abuts against the surface of the frame through which the shaft extends. The abutment may also be considered as an obstructing element, stop, block, inhibitor or impeder. The shaft may be considered as an output shaft or a driveshaft. The shaft is disposed in the drivetrain assembly such that it extends through an opening (aperture, hole, passage, slot) provided in the surface of the frame which the abutment is configured to engage with. The abutment is provided in cooperation with the shaft such that the abutment moves with the shaft, i.e. the abutment and the shaft move jointly, in cooperation, in unison or as one.

The given direction may be along a longitudinal axis of the shaft and so the shaft may move along the longitudinal axis, relative to the frame, for the threshold distance. The longitudinal axis of the shaft may also be considered as an axial direction of the shaft. The movement of the shaft in the given direction may be caused by the application of a force on the shaft. For example, the force may be a drop force caused by dropping the personal care device such that the shaft makes contact with a hard surface, causing the shaft to move in the given direction, along the longitudinal axis of the shaft. Movement of the shaft may not exclusively be in the given direction, but it is movement in the given direction above the threshold distance that causes engagement of the engagement surface of the abutment and the surface of the frame.

According to a preferred embodiment, the abutment may be a collar comprising: a main body with an inner diameter corresponding to the diameter of the shaft; and an engagement portion configured to project from the main body and to provide the engagement surface. If the abutment is a collar, then the collar may be placed over the shaft to provide cooperation of the shaft and the collar, such that the shaft extends through the collar. That is, the collar comprises an opening or core configured to receive the shaft. Accordingly, the inner diameter of the main body of the collar may correspond to the diameter of the shaft such that the shaft receives the collar and the collar fits snugly onto the shaft. The diameter of the shaft may therefore be slightly less than the inner diameter of the main body of the collar. Accordingly, the inner diameter of the main body and the diameter of the shaft may be interdependent or complimentary such that the inner diameter of the main body may determine the diameter of the shaft, or vice versa.

Different parts of the shaft may have different diameters. If this is the case, then the inner diameter of the main body of the collar may correspond to the diameter of the shaft at the position at which the collar is disposed. The inner shape of the collar may correspond to the outer shape of the shaft at the position at which the collar is disposed. That is, the shape of the cross-section of the shaft may match the shape of the opening of the cross-section of the collar. The collar may also be considered as a flanged collar, sleeve or bearing. If the collar is considered as a flanged collar, then the flange may be the engagement portion.

The engagement portion of the collar extends from the main body such that it is configured to engage with the surface of the frame. Thus, it is evident that the engagement portion projects past the opening of the surface, and so the total diameter or width of the collar, including the engagement portion, is greater than the width of the opening. The engagement portion may also be considered as a projection or lip, or a plurality of projections or lips.

The abutment may also be provided as a ring or a washer, or any other component that is able to cooperate with the shaft and engage with the frame. The abutment may also be formed as part of the shaft. For example, the shaft may comprise one or more protrusions which extend beyond the opening of the frame and are configured to engage with the surface of the frame such that they provide the engagement surface. Similarly, a widening of the shaft may be presented to engage with the frame and to provide abutment and the engagement surface. If the abutment is provided as part of the shaft, then the drivetrain may be assembled to position the shaft with respect to the frame prior to the rotor assembly such that a small airgap is provided between the surface of the frame through which the shaft extends and the engagement surface of the abutment.

Furthermore, the main body of the collar may have an outer diameter corresponding to the width of the opening. That is, the outer diameter of the main body may correspond to the width of the opening such that the main body is able to fit in the opening with little or no friction, i.e. the opening is configured to receive the main body of the abutment. The outer diameter of the main body may therefore be slightly less than the width of the opening to allow clearance for the main body to fit into the opening without engaging with the edges of the opening. Accordingly, the outer diameter of the main body and the width of the opening may be interdependent or complimentary such that the outer diameter of the main body may determine the width of the opening, or vice versa.

Of course, it will be appreciated that the width of the opening relates to the size of the opening across a section of the opening which receives the collar. If the opening is provided as a circular opening, then the width of the opening refers to the diameter of the opening. Receipt of the main body of the collar in the opening may prevent lateral movement of the shaft in the opening in one or more directions. That is, movement in direction(s) substantially perpendicular to the given direction. The shape of the opening may, at least partially, match the outer shape of the collar such that the opening is configured to receive the main body of the collar.

The drivetrain assembly may also comprise: a motor comprising a rotor and a stator. The rotor may comprise a rotor surface; the stator may comprise a stator surface which is disposed opposite the rotor surface; and the threshold distance may be less than the distance between the stator surface and the rotor surface. The rotor and stator of the motor are separated by an airgap, and the distance between the stator surface and the rotor surface may define the airgap of the motor. The shaft may be attached or connected to the rotor such that movement of the shaft will also cause movement of the rotor towards the stator and a reduction of the airgap. Therefore, if the threshold distance is less than the distance between the rotor surface and the stator surface, movement of the shaft and the rotor will be inhibited by the abutment before the rotor surface contacts the stator surface. Thus, engagement of the abutment and the frame may prevent the airgap of the motor from closing.

The threshold distance may preferably correspond to a predetermined force applied to the shaft in the given direction. That is, the threshold distance may correspond to or equal a distance that the shaft moves in the given direction when the predetermined force is applied to the shaft. Accordingly, the abutment may be provided at a position on the shaft that inhibits movement of the shaft past a certain point, corresponding to a force applied to the shaft. If a force smaller than the predetermined force is applied to the shaft, then the distance that the shaft moves may be less than the threshold distance, such that the abutment does not engage with the frame. If a force greater than the predetermined force is applied to the shaft, then the shaft is prevented from moving further than the threshold distance by engagement of the abutment with the surface of the frame.

The predetermined force may correspond to a force that is considered to be a safe limit for the sensitive components in the drivetrain. That is, the predetermined force may be a force that is tolerable for the sensitive components of the drivetrain such that failure of the components is unlikely to result from application of the predetermined force to the shaft. For a force applied to the shaft up to the predetermined force, the abutment does not engage with the surface of the frame and the path of the force is through the shaft and components of the drivetrain, such as the motor. The predetermined force, and forces less than the predetermined force, may therefore be forces that the components of the drivetrain are able to tolerate without failing. For forces greater than the predetermined force, the abutment engages with the frame and so the path of the force is redirected through the frame and away from the components of the drivetrain.

According to embodiments of the present invention, the shaft and the abutment may be configured to jointly move between a primary position and a secondary position relative to the frame. The engagement surface of the abutment and the surface of the frame may not be in engagement at the primary position; and the engagement surface of the abutment and the surface of the frame may be in engagement at the secondary position. The threshold distance may correspond to or equal the distance between the engagement surface of the abutment and the surface of the frame at the primary position.

The primary position may be considered as the position of the shaft and abutment during normal operation. At this position, a gap is provided between the engagement surface of the abutment and the surface of the frame. The secondary position may be considered as the position of the shaft when a predetermined force, such as a drop force, is applied to the shaft. At the secondary position, the shaft and the abutment have moved in the given direction such that there is no gap between the engagement surface of the abutment and the surface of the frame, and the two surfaces are in contact. Engagement of the surfaces inhibits further movement of the shaft and the abutment.

Thus, as force is applied to the shaft which causes the shaft and the abutment to move in the given direction, the shaft and the abutment move from the primary position and the distance between the engagement surface of the abutment and the surface of the frame decreases. If the force is increased up to a predetermined force or more, then the abutment and the shaft reach the secondary position. The distance between the engagement surface of the abutment and the surface of the frame at the primary position is the threshold distance. That is, the threshold distance is the distance that the engagement surface of the abutment moves between the primary position and the secondary position.

The abutment may be preferably fixed to the shaft. That is, the cooperation of the shaft and the abutment may be achieved by fixing the abutment to the shaft. The abutment may be fixed to the shaft by any suitable means, such as, for example, by laser welding. The position of the abutment on the shaft may be determined by the position of the shaft with respect to the frame and the threshold distance. The threshold distance may be 0.2 mm or less.

According to an embodiment of a second aspect, there is provided a personal care device comprising a drivetrain assembly according to the above aspects of the present invention. For example, the personal care device may be an oral care device, such as a power toothbrush, a power shaver, or a skin care device, such as a skin massager. Embodiments of the present invention may be applied to any personal device with a shaft that is likely to have a relatively significant force exerted on it, such as, for example, a drop force from dropping of the device.

Embodiments of the present invention therefore extend to a drivetrain assembly and a personal device comprising the drivetrain assembly. Features of the first aspect apply to the second aspect mutatis mutandis, and vice versa.

The present invention extends to method aspects corresponding to the apparatus aspects.

In particular, according to an embodiment of a third aspect, there is provided a method of manufacturing a drivetrain assembly for a personal care device, the method comprising: resiliently mounting a shaft in a frame of the drivetrain assembly such that the shaft extends through an opening in a surface of the frame; placing an abutment in movable engagement with the shaft at a first position on the shaft such that an engagement surface of the abutment is in engagement with the surface of the frame; applying a predetermined force to the shaft in a given direction along a longitudinal axis of the shaft such that the shaft moves relative to the frame in the given direction and the abutment moves to a second position on the shaft due to engagement of the engagement surface of the abutment and the surface of the frame; releasing the predetermined force applied to the shaft such that the shaft moves relative to the frame in a direction opposite to the given direction and the abutment moves with the shaft such that the abutment remains at the second position on the shaft and the engagement surface of the abutment is no longer in engagement with the surface of the frame; and fixing the abutment to the shaft at the second position.

Accordingly, a drivetrain assembly according to embodiments of the present invention may be manufactured using the above method. The manufacturing method allows for a small, predefined distance to be provided with precision between the engagement surface of the abutment and the surface of the frame. This distance corresponds to (or equals) the distance that the shaft moves when the predetermined force applied to the shaft is released and the distance may be considered as equating to the threshold distance described above. The distance is dependent on the force applied to the shaft and the resilience of the shaft mounted in the frame.

In the manufacturing method, the predetermined force is applied to the shaft which causes the abutment to move from a first position on the shaft to a second position on the shaft, due to engagement with the surface of the frame. The shaft is resiliently mounted in the frame such that, when the predetermined force is no longer applied to the shaft, the shaft returns to a position corresponding to (equal to or similar to) the position it was in before the force was applied. Movement of the shaft is with respect to the frame.

The abutment is movably engaged with the shaft such that the two elements move together, unless the abutment is impeded from moving in unison with the shaft by engagement with the frame. If the abutment engages with the surface of the frame, then the moveable engagement of the shaft and the abutment allows for the abutment to move along the shaft as force is applied to the shaft in the given direction. That is, since the abutment contacts the surface of the frame and does not, at least entirely, pass through the opening in the surface of the frame, the abutment moves along the shaft to the second position as the shaft moves relative to the frame in the given direction. It may therefore also be considered that the shaft moves relative to the abutment when the abutment and frame are in engagement. Movement of the abutment from the first position to the second position is in a direction opposite to the given direction because the shaft is moving in the given direction. The moveable engagement of the abutment and the shaft means that, when the force is released from the shaft and the shaft moves in the direction opposite to the given direction, the abutment moves with the shaft since movement of the abutment is not impeded by the frame, i.e. the abutment moves away from the frame with the shaft, and so the abutment is no longer engaged with the frame.

In other words, engagement of the frame and the abutment impedes the abutment and prevents it from moving with the shaft when the force is applied to the shaft and the shaft moves relative to the frame in the given direction. Conversely, when the shaft returns to its start position after the force is released from the shaft, movement of the shaft is in a direction opposite to the given direction and the abutment moves with the shaft. Since the shaft is moving away from the frame, there is no impedance to the movement of the abutment with the shaft. Thus, the abutment stays in the second position and moves with the shaft, due to the engagement of the shaft and the abutment.

The distance between the first position and the second positon of the abutment defines the threshold range of movement of the shaft, with respect to the frame. Once the abutment is fixed to the shaft, the abutment inhibits the shaft from moving in the given direction past the threshold distance, when a force is applied to the end of the shaft.

The abutment may be a collar comprising: a main body with an inner diameter corresponding to the diameter of the shaft; and an engagement portion configured to project from the main body and to provide the engagement surface. The collar may be placed in movable engagement with the shaft by sliding the collar over the shaft. The shaft may therefore receive the collar such that the shaft extends through the opening of the collar. In order to provide the movable engagement of the shaft and the abutment, the inner diameter of the main body of the collar may be configured with the diameter of the shaft to provide a snug fit of the collar over the shaft. The inner diameter of the main body may therefore be slightly larger than the diameter of the shaft. Accordingly, the inner diameter of the main body and the diameter of the shaft may be interdependent or complimentary such that the inner diameter of the main body may determine the diameter of the shaft, or vice versa.

Furthermore, if the abutment is provided as a collar, the main body may have an outer diameter corresponding to the width of the opening in the surface of the frame. The width of the opening may also be considered to be the diameter of the opening if, for example, the opening is provided as a hole. Accordingly, the outer diameter of the main body of the collar may correspond to the width of the opening in the surface of the frame such that the main body of the collar may be received in the opening and a snug fit may be provided between the main body and the opening. The outer diameter of the main body of the collar may therefore be slightly less than the width of the opening in the surface of the frame. Thus, the outer diameter of the main body and the width of the opening may be interdependent or complimentary such that the outer diameter of the main body may determine the width of the opening, or vice versa.

The main body of the collar may therefore extend through the opening in the surface of the frame and fit snugly into the opening, such that lateral movement of the shaft in the opening is inhibited by the main body of the collar. Of course, since the engagement portion of the collar provides the engagement surface of the abutment which is in engagement with the surface of the frame, it is evident that the engagement portion of the collar does not, at least entirely, extend or pass through the opening of the frame. It may therefore be considered that the total diameter of the collar including the engagement portion is greater than the width of the opening.

The abutment may be fixed to the shaft at the second position by any suitable means. For example, the abutment may be fixed to the shaft at the second position by laser welding.

The predetermined force may correspond to a force that is considered to be a safe limit for the sensitive components in the drivetrain. That is, the predetermined force may be a force that the sensitive components are able to tolerate without failure or malfunction. The predetermined force may be 50N or less.

It may therefore be seen that embodiments of the present invention may provide means for inhibiting movement of the shaft relative to the frame past an acceptable distance. Engagement of the abutment and the frame may redirect the path of a force applied to the shaft away from sensitive components of the drivetrain, so as to protect the sensitive components in the event of, for example, an axial drop on the shaft. As discussed above, the manufacturing method according to embodiments of the present invention may allow the distance between the abutment and the frame to be set at a suitable distance.

BRIEF DESCRIPTION OF THE DRAWINGS

Embodiments of the present disclosure may take form in various components and arrangements of components, and in various steps and arrangements of steps. Accordingly, the drawings are for purposes of illustrating the various embodiments and are not to be construed as limiting the embodiments. In the drawing figures, like reference numerals refer to like elements. In addition, it is to be noted that the figures may not be drawn to scale.

DETAILED DESCRIPTION

Figure 1:
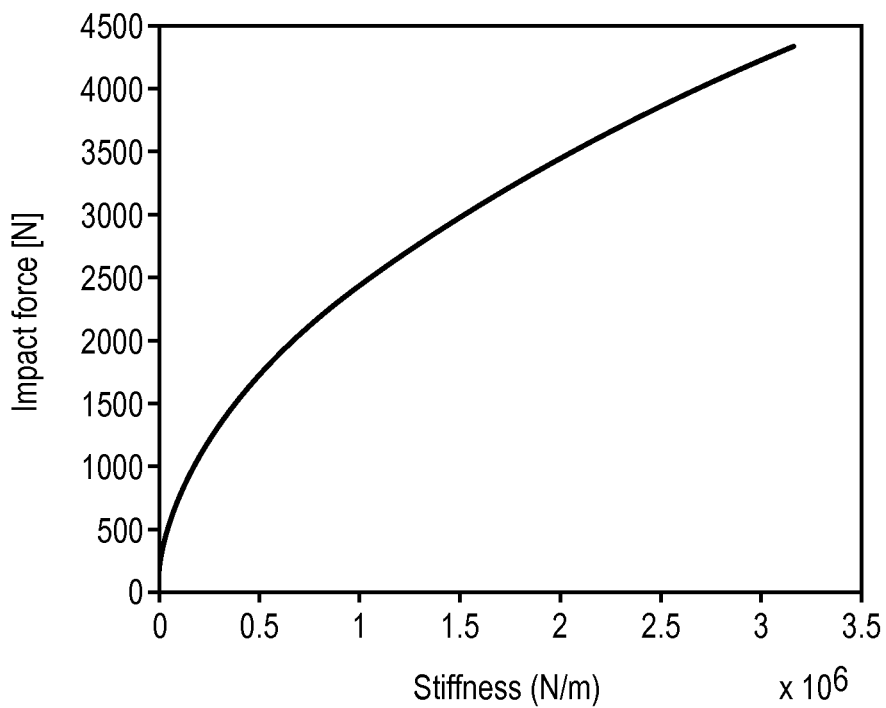
FIG. 1 is a graph showing the relationship between drop forces and axial stiffness.

The embodiments of the present disclosure and the various features and advantageous details thereof are explained more fully with reference to the non-limiting examples that are described and/or illustrated in the drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the present disclosure. The examples used herein are intended merely to facilitate an understanding of ways in which the embodiments of the present may be practiced and to further enable those of skill in the art to practice the same. Accordingly, the examples herein should not be construed as limiting the scope of the embodiments of the present disclosure, which is defined solely by the appended claims and applicable law.

It is understood that the embodiments of the present disclosure are not limited to the particular methodology, protocols, devices, apparatus, materials, applications, etc., described herein, as these may vary. It is also to be understood that the terminology used herein is used for the purpose of describing particular embodiments only, and is not intended to be limiting in scope of the embodiments as claimed. It must be noted that as used herein and in the appended claims, the singular forms "a," "an," and "the" include plural reference unless the context clearly dictates otherwise.

Unless defined otherwise, all technical and scientific terms used herein have the same meanings as commonly understood by one of ordinary skill in the art to which the embodiments of the present disclosure belong. Preferred methods, devices, and materials are described, although any methods and materials similar or equivalent to those described herein may be used in the practice or testing of the embodiments.

As discussed above, it is desirable to provide a personal care device with drop protection. Means for reducing the drop forces have been considered in the art and such methods rely on reducing the axial stiffness of the drivetrain in order to delay the impact and average out the impact forces over time, so as to limit the effects of an axial drop.

FIG. 1 shows a graphical representation of the relationship between drop forces and reduced axial stiffness. As can be seen from the drop model of FIG. 1, the drop forces may be lessened by reducing the stiffness of the drivetrain. Thus, by reducing the axial stiffness of the drivetrain in a device such as a power toothbrush, the peak drop forces are also reduced yet last longer in time. The lower drop forces are less likely to cause internal damage to the power toothbrush. In the simplified model of FIG. 1, the stiffness can be seen as a (reciprocal) summation of the contact stiffness (of, for example, the floor) and the internal stiffness of the drivetrain.

Figure 2A:
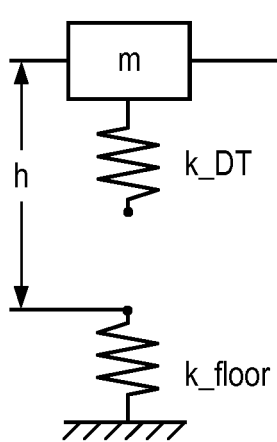
FIGS. 2(a) to 2(c) are diagrams of a model of impact forces.
Figure 2B:
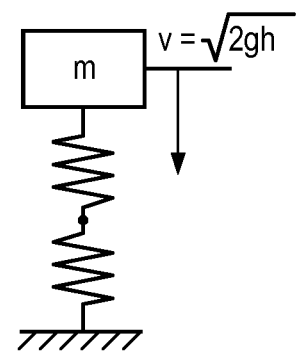
Figure 2C:
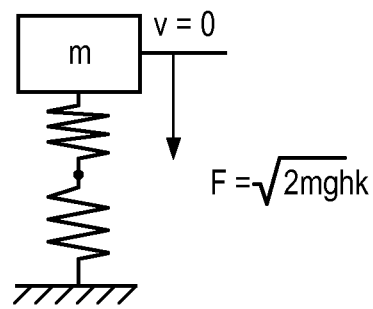

FIGS. 2a to 2c show an exemplary model of impact forces from dropping a device onto a surface, such as the floor. FIG. 2a shows the device with mass m being dropped from a certain height h. The drivetrain has a stiffness of k_DT and the floor has a contact stiffness k_floor, and the device has no velocity at this point. In FIG. 2b, the device contacts the floor. At this point the two springs may be (reciprocally) summed into one spring, k_total. At the moment immediately prior to contact, the velocity is maximum. In FIG. 2c, all of the energy is absorbed in the spring, and so spring deflection is at a maximum and the velocity is zero. The force in the springs scale with the square root of the mass and total stiffness. Therefore, reducing the stiffness of the device reduces the magnitude of the drop forces.

Figure 3A:
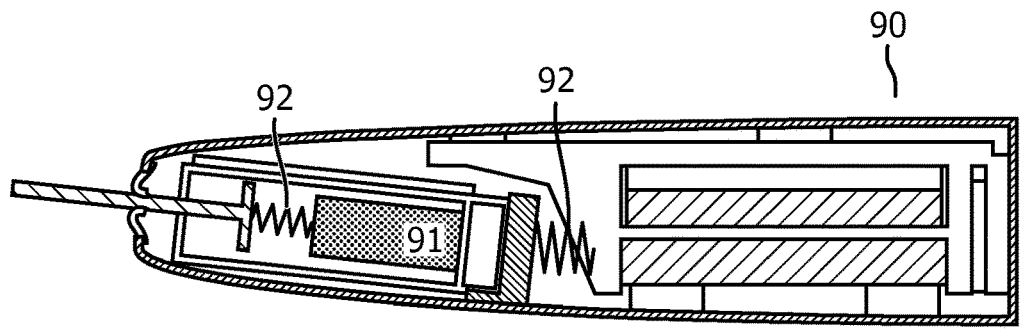
FIGS. 3(a) and 3(b) are diagrams of a prior art power toothbrush known in the art.
Figure 3B:
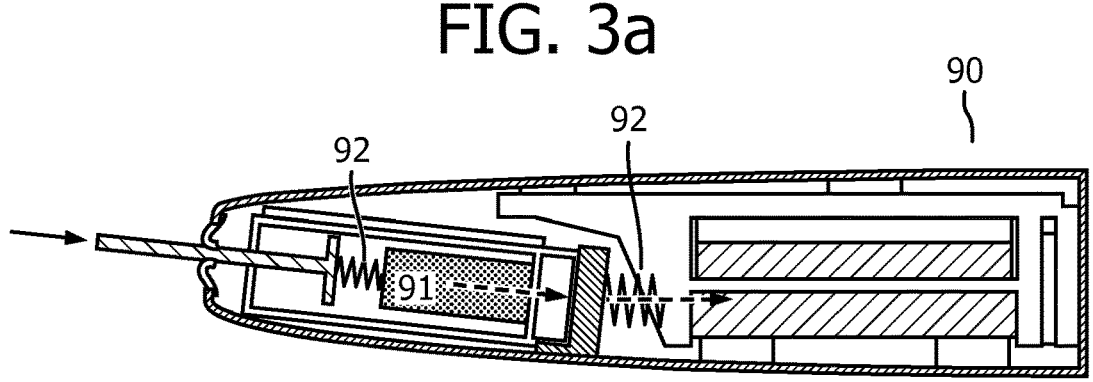

FIGS. 3a and 3b show a power toothbrush 90 with reduced axial stiffness. In the power toothbrush 90 of FIGS. 3a and 3b, at least one spring 92 is provided to reduce impact forces (shown by the arrows in FIG. 3b) and to protect the fragile components 91 of the drivetrain. However, there are a number of disadvantages to reducing the axial stiffness in a drivetrain. Firstly the design complexity is increased since additional components and/or more complex components are required to reach the low stiffness in the axial direction while retaining the primary function of the drivetrain. Secondly, the volume requirements of the device increase when stiffness is reduced because more space is required for the drivetrain elements to slide back.

Figure 4A:
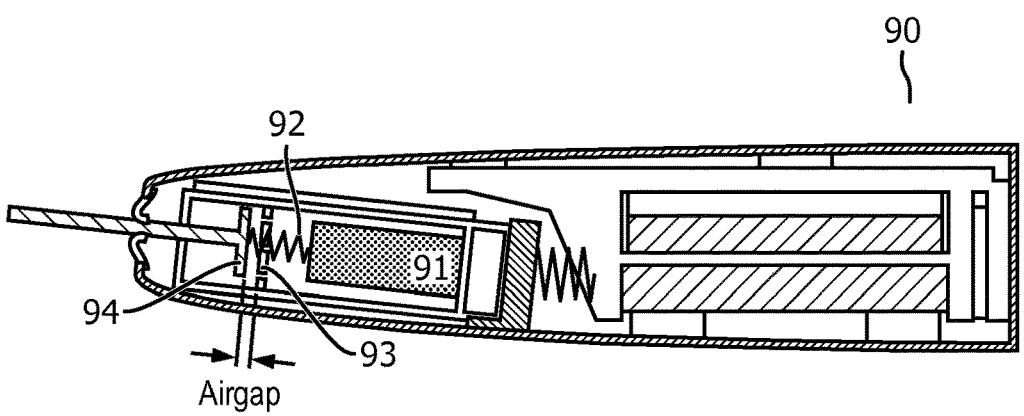
FIGS. 4(a) and 4(b) are diagrams of a prior art power toothbrush known in the art.
Figure 4B:
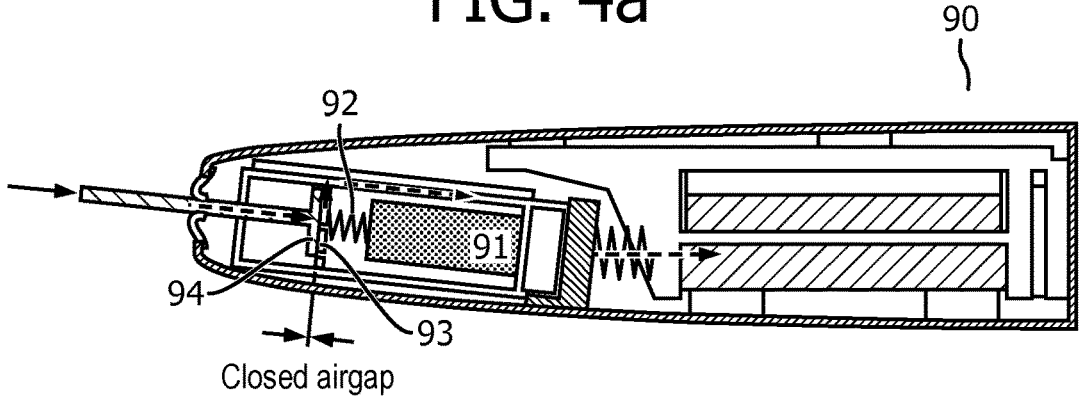

An alternative strategy to reduce the effect of an axial drop is to transfer the impact force to non-sensitive parts in the drivetrain construction. This may be achieved by closing an airgap between the shaft hub and the frame of the drivetrain. The closing of such a gap effectively redirects the force path away from the most vulnerable parts in the drivetrain. FIGS. 4a and 4a show a power toothbrush 90 comprising such a construction, with an airgap provided between a shaft hub 94 and a frame 93 in FIG. 4a, and a closed airgap shown in FIG. 4b.

However, there are a number of disadvantages to such an approach. Due to tolerances in the drivetrain, it is difficult in production to achieve the required airgap size, which is ideally as small as possible so as to limit the force through the drivetrain. A larger airgap means that a higher force is applied to the drivetrain before the airgap is closed. Thus higher forces are applied to the drivetrain and elastic components of the drivetrain may be damaged.

It is therefore desirable to overcome the disadvantages of the above approaches and provide a drivetrain assembly with drop protection.

Figure 5:
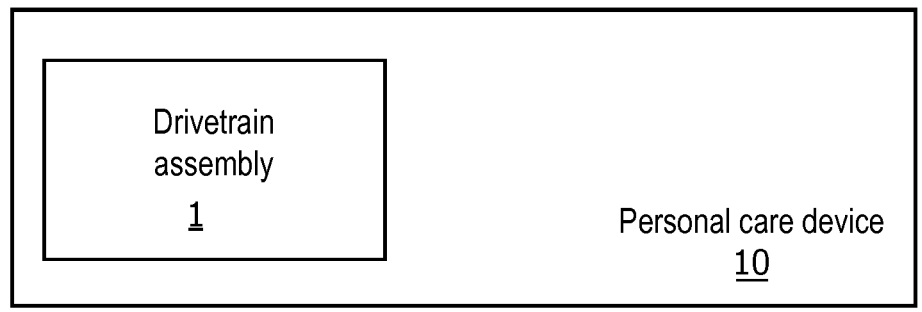
FIG. 5 is a block diagram representation of a personal care device according to a general embodiment of an aspect of the invention.

FIG. 5 is a block diagram of a personal care device according to a general embodiment of an aspect of the invention. The personal care device 10 comprises a drivetrain assembly 1, according to embodiments of the present invention. The personal care device 10 may, for example be an oral care device, such as a power toothbrush, or may be a power shaver or a skin care device, such as a skin massager.

Figure 6:
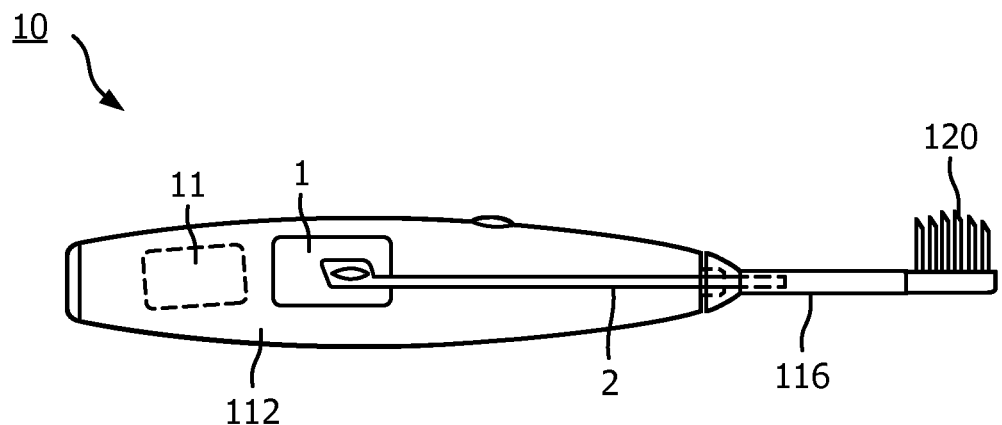
FIG. 6 is a diagram of a power toothbrush to which embodiments of aspects of the present invention may be applied.

FIG. 6 shows an exemplary personal care device 10 in which the teaching of the present disclosure may be implemented. The personal care device in FIG. 6 is in the form of an electric toothbrush (power toothbrush), but it will be appreciated that this is not limiting, and the teaching of the present disclosure may be implemented in other devices comprising a motor. For example the teachings may be applied to personal care devices such as tongue cleaners, shavers, hair clippers or trimmers, hair removal devices, or skin care devices. The personal care device 10 has an attachment structure 116 and a handle portion 112. The handle portion has a motor 11. In one embodiment, the attachment structure 116 comprises or is a replaceable attachment, i.e. the attachment structure 116 may be removed from the personal care device 10 and replaced by another attachment structure 116. The personal care device 10 preferably comprises or is a power toothbrush, and the attachment structure 116 may comprise a brush head 118. The handle 112 includes a drivetrain 1 and a drive shaft 2. The drive shaft 2 extends from a distal end of the handle 112, and into the attachment structure 116 when an attachment structure 116 is attached to the handle 112.

The motor 11 may comprise a motor controller (i.e., control electronics) which may be any suitable controller, microcontroller, processor, power source and/or other electronics to provide power and control signals for implementing the various functions, or any combination thereof, as discussed further herein. In embodiments, the motor 11 may be configured for providing and controlling an operation or operations of the drivetrain 1 to produce a mechanical stimulus. The mechanical stimulus may comprise vibrations or other movements at a high frequency, for example, a frequency greater than 50 Hz, and for example a frequency in the range of 250-300 Hz. The drivetrain 1 and drive shaft 2 may be provided as part of a drivetrain assembly according to embodiments of the present invention.

With reference still to FIG. 6, the distal end of the attachment 116 may include an operational component 120, configured according to the requirements of a specific application of the attachment 116. In the example of FIG. 6, the personal care device is an electric toothbrush, and the operational component 120 is a toothbrush head. However, it can be appreciated that the operational component would vary for different types of personal care devices. In operation, responsive to the motor 11 operating to control an operation of the drivetrain 1 and drive shaft 2 to produce a mechanical stimulus the attachment structure 116 implements a cleaning motion of the operational component 120.

Figure 7A:
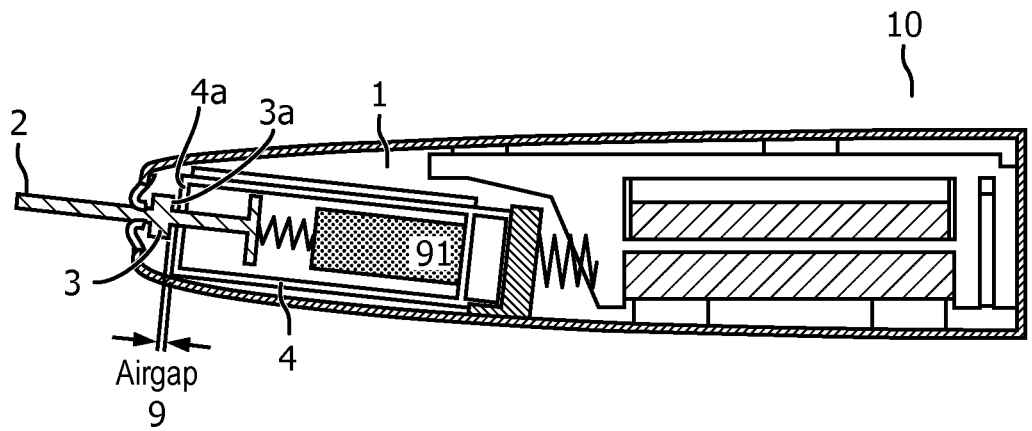
FIGS. 7(a) and 7(b) are diagrams of a drivetrain assembly according to an embodiment of an aspect of the invention.

FIGS. 7a and 7a show an arrangement according to an embodiment of an aspect of the invention. The personal care device 10 of FIGS. 7a and 7b includes a drivetrain assembly 1. The drivetrain assembly 1 comprises a shaft 2, an abutment 3 and a frame 4. The abutment 3 works in cooperation with the shaft 2 so as to provide an airgap 9 between an engagement surface 3a of the abutment 3 and a surface 4a of the frame 4 (frame surface). In this embodiment, the airgap 9 corresponds to the threshold distance, such that the shaft 2 may move in the given direction by the threshold distance to close the airgap 9. That is, the shaft 2 and the abutment 3 may move towards the frame 4. When the airgap 9 is closed, the abutment 3 and the frame 4 are in engagement and further movement of the shaft 2 in the given direction is impeded. Accordingly, the force flow of a force applied to the shaft 2 which causes it to move in the given direction is directed through the frame 4 and away from the sensitive components 91 of the drivetrain.

Figure 7B:
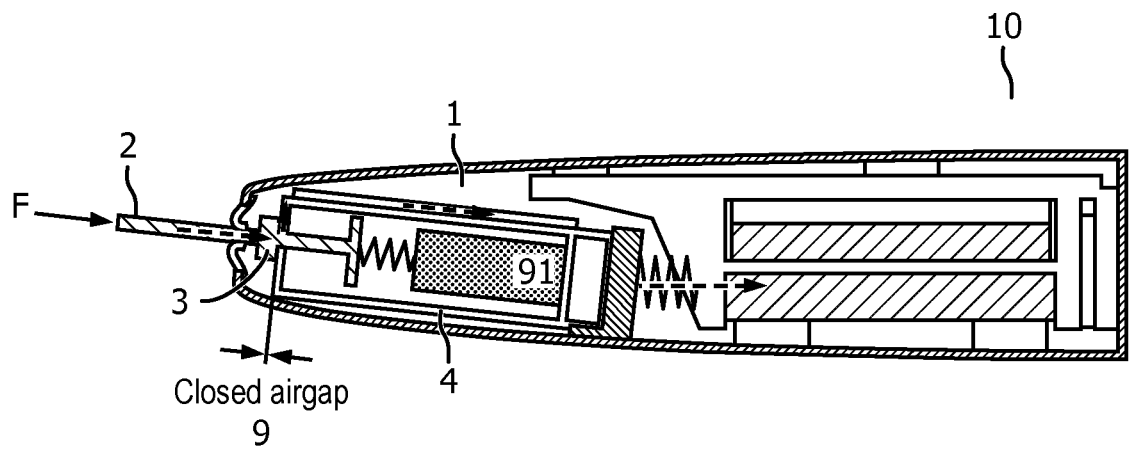

FIG. 7a shows an initial position of the shaft 2 and abutment 3 which may be considered as a position during normal operation, i.e. a primary position. In FIG. 7b, a force F is applied to the shaft 2 which causes the shaft 2 and abutment 3 to move together in the given direction, such that the airgap 9 is closed and the engagement surface 3a of the abutment 3 engages with the surface 4a of the frame 4 through which the shaft 2 extends. This position may be considered as a drop position reflective of a drop event of a personal care device 10 comprising the drivetrain assembly 1, i.e. a secondary position.

The abutment 3 is a component that acts as a drop protector. The abutment works in cooperation with the drivetrain shaft (rotor) and is configured to contact the drivetrain frame in case of the personal care device being dropped, so as to effectively redirect the force flow away from sensitive parts inside the drivetrain. Due to the arrangement of the abutment, shaft and frame, a very small airgap may be provided between the abutment (drop protector) and the frame of the drivetrain (drivetrain frame).

Figure 8:
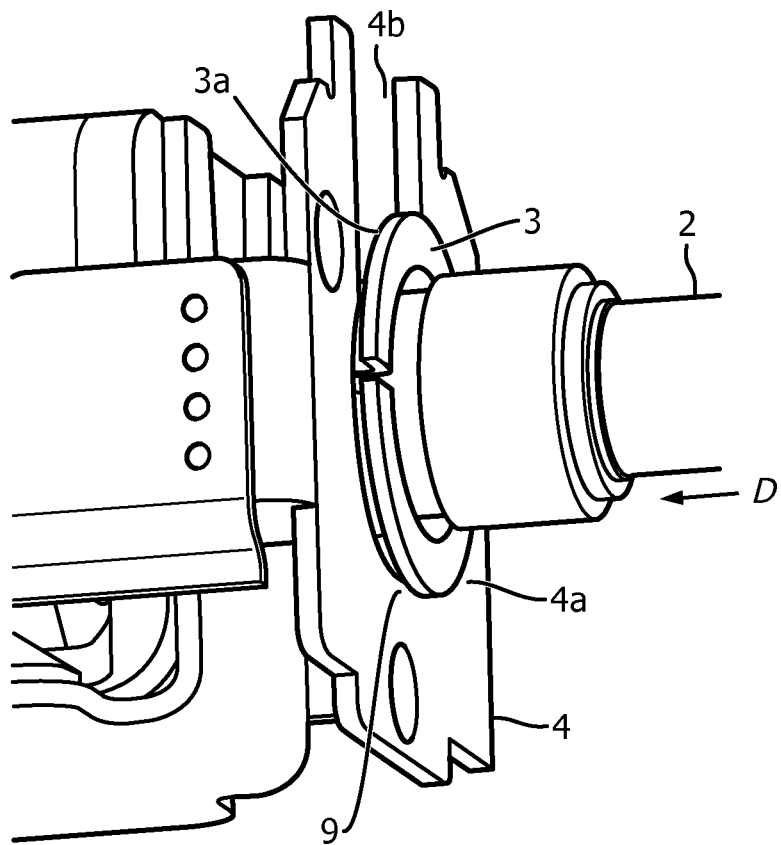
FIG. 8 is a diagram of part of a drivetrain assembly according to an embodiment of an aspect of the invention.

FIG. 8 shows a part of a drivetrain assembly according to an embodiment of an aspect of the invention. The abutment 3 is provided in cooperation with the shaft 2. A gap 9 is provided between the engagement surface 3a of the abutment 3 and the surface 4a of the frame 4. The gap 9 corresponds to the threshold distance and the shaft is able to move in the given direction D for the threshold distance, before further movement is inhibited by the engagement of the abutment 3 and the frame 4.

In the embodiment shown in FIG. 8, the abutment 3 is provided as a collar placed over the shaft 2, although other configurations are possible. The main body of the collar corresponds to the opening 4b in the frame 4 such that the main body of the collar is at least partially received in the opening 4b. The collar further comprises a lip, projection or engagement portion which extends from the main body of the collar and extends beyond the opening 4b in the frame 4. The engagement portion provides the engagement surface 3a which is configured to engage with the surface 4a of the frame 4.

Figure 9:
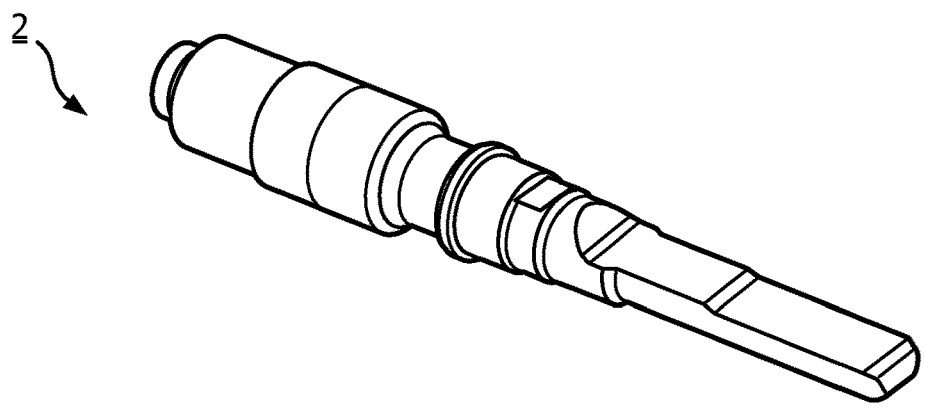
FIG. 9 is a diagram of part of a shaft according to an embodiment of an aspect of the invention.
Figure 10:
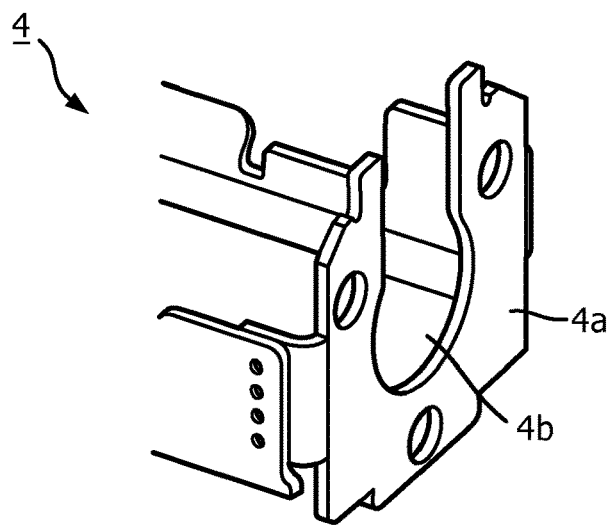
FIG. 10 is a diagram of part of a frame according to an embodiment of an aspect of the invention.
Figure 11:
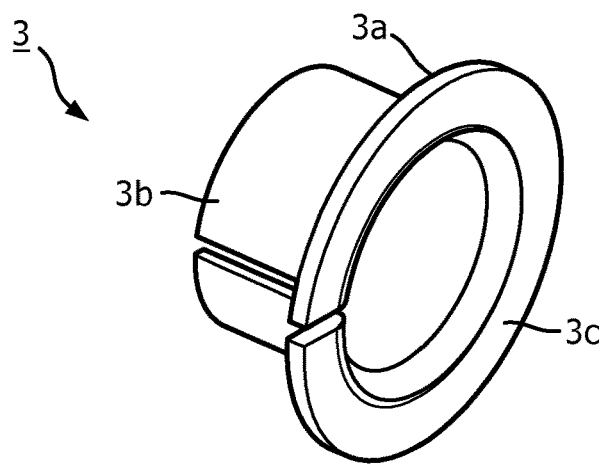
FIG. 11 is a diagram of an abutment according to an embodiment of an aspect of the invention.

FIGS. 9 to 11 show individual components of the drivetrain assembly according to an embodiment of an aspect of the invention. Specifically, FIG. 9 shows a schematic diagram of part of a shaft 2 according to an embodiment of an aspect of the invention; FIG. 10 shows a schematic diagram of part of a frame 4 according to an embodiment of an aspect of the invention; and FIG. 11 shows a schematic diagram of an abutment 3 according to an embodiment of an aspect of the invention. As shown in FIG. 10, the frame 4 comprises a frame opening 4b which is the opening of the frame 4 through which the shaft 2 extends when the drivetrain assembly is constructed. The frame 4 further comprises a frame surface 4a. As shown in FIG. 11, the abutment 3 comprises a main body 3b and an engagement portion 3c. The abutment 3 further comprises an engagement surface 3a which is configured to engage with or contact the frame surface 4a of the frame, the engagement surface 3a being a surface of the engagement portion 3c. Thus, when the drivetrain components are assembled, the engagement surface 3a is disposed opposite (i.e. facing) the frame surface 4a. The components of FIGS. 9 to 11 may be the components of the drivetrain assembly shown in FIG. 8.

Embodiments of the present invention may therefore make use of the existing (usually low) axial compliance in the drivetrain. The abutment is placed as an adapter on the shaft, at a position where a very small gap to the drivetrain frame is provided. The small gap may be closed in the case of a drop event, as illustrated in FIG. 7(b). The distance between the abutment and the frame may be 0.2 mm or less. The airgap provided by embodiments of the present invention may be smaller than airgaps provided in alternative devices known in the art, such as that of FIG. 4. The airgap in such devices known in the art is usually formed by two subassemblies comprising multiple elements which have to be positioned relative to each other. Due to assembly tolerances, it is difficult to achieve airgaps which are smaller than 0.5 mm, i.e. if the nominal drivetrain design would contain an airgap of 0.2 mm there is a risk that a percentage of the manufactured devices have a zero airgap (airgap closure). Airgap closure results in a large amount of friction between the drivetrain and the rotor, which leads to a defective device.

Figure 12:
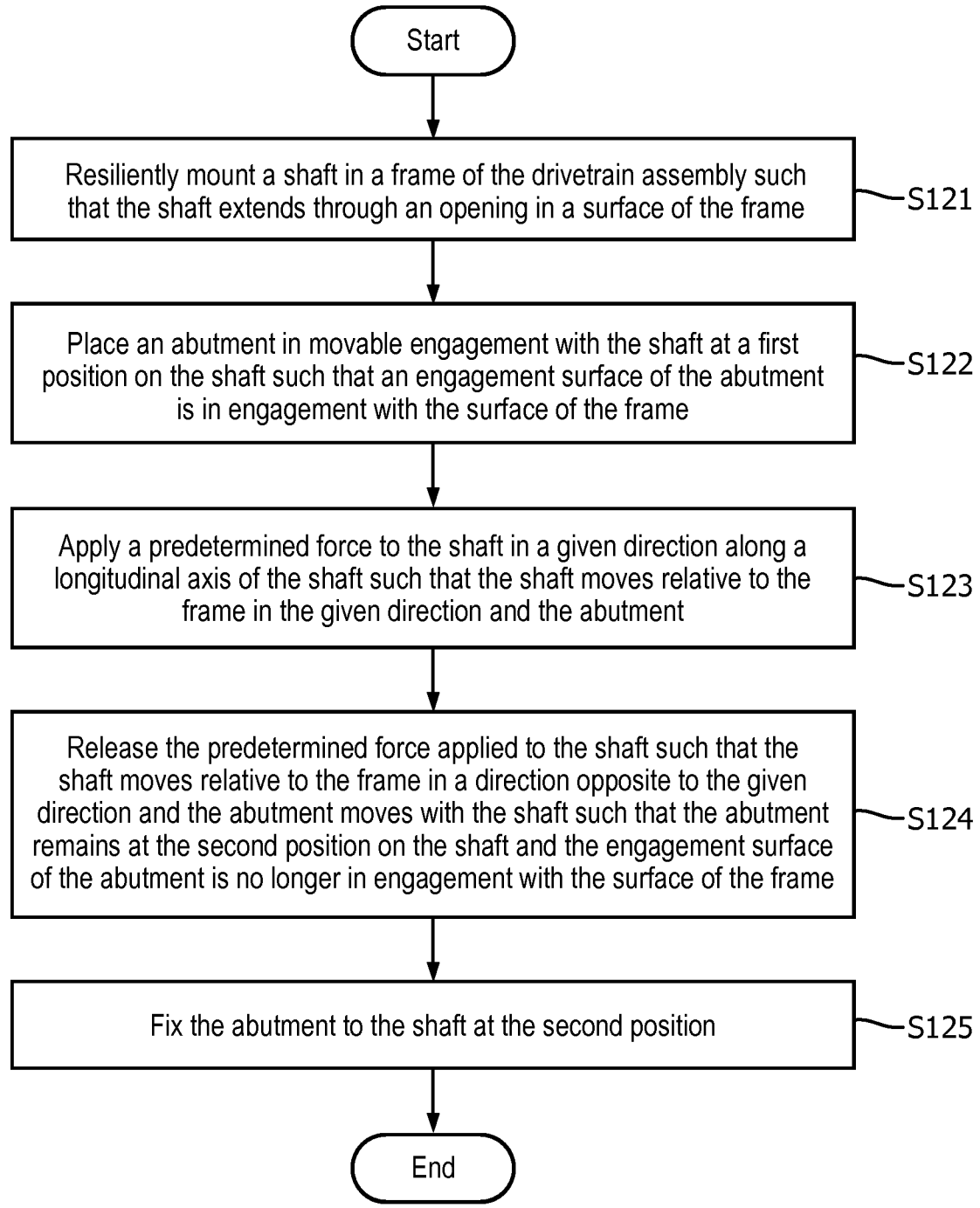
FIG. 12 is a flow chart of the manufacturing method according to an embodiment of the invention.

FIG. 12 is a flow chart of the manufacturing method according to an embodiment of the invention. Firstly, in step S121, a shaft is resiliently mounted in a frame of the drivetrain assembly such that the shaft extends through an opening in a surface of the frame. In step S122 an abutment is placed in movable engagement with the shaft at a first position on the shaft such that an engagement surface of the abutment is in engagement with the surface of the frame in step, and a predetermined force is then applied to the shaft in a given direction along a longitudinal axis of the shaft such that the shaft moves relative to the frame in the given direction and the abutment in step S123. In step S124 the predetermined force applied to the shaft is released such that the shaft moves relative to the frame in a direction opposite to the given direction and the abutment moves with the shaft such that the abutment remains at the second position on the shaft and the engagement surface of the abutment is no longer in engagement with the surface of the frame. Finally, in step S125, the abutment is fixed to the shaft at the second position.

FIGS. 13a to 13d are a sequence of diagrams for use in explaining a method of manufacturing part of a drivetrain assembly according to an embodiment of an aspect of the invention. By way of example only, the method is described with reference to the part of the drivetrain assembly shown in FIG. 7. The drivetrain assembly shown in FIGS. 13a to 13d also comprises a motor, comprised of a rotor 5 and a stator 6. The shaft 2 is connected to the rotor 5 such that movement of the shaft 2 (for example, from application of a force to the shaft 2) also causes movement of the rotor 5. Similarly, movement of the rotor 5 (for example, due to operation of the motor) also causes movement of the shaft 2. Manufacture of these parts of the drivetrain assembly will not be described here.

Figure 13A:
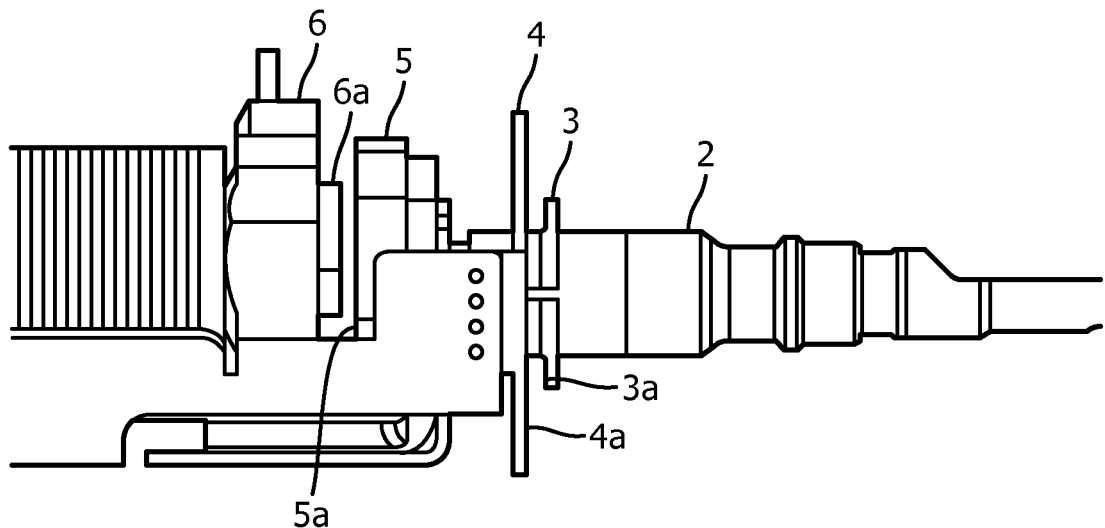
FIGS. 13(a) to 13(d) are a sequence of diagrams for use in explaining a manufacturing method according to an embodiment of another aspect of the invention.

As depicted in FIG. 13a, the abutment (drop protector) 3 is placed in moveable engagement with the shaft 2 so that the abutment 3 may move along the shaft. In the embodiment shown in FIGS. 13a to 13d, the abutment 3 is a collar which is slid over the shaft 2. Due to the dimensions of the collar and the shaft 2, it is possible to slide the collar over the shaft 2 with sufficient friction for the collar to grip the shaft 2, but without too much friction that the collar cannot slide along the shaft 2. Although the abutment is depicted as a collar, embodiments of the present invention are not limited to such an arrangement. For example, the abutment may be a ring or a washer, or any other component that may be provided in movable engagement with the shaft and may engage with the frame.

Figure 13B:
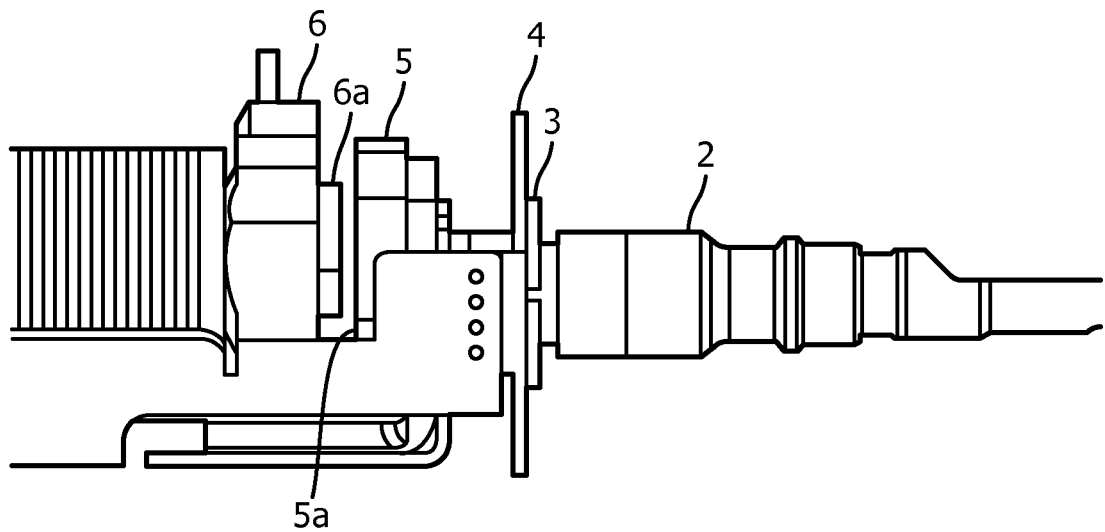

As depicted in FIG. 13b, the abutment 3 is pushed against the frame 4 such that there is no space or gap between the abutment 3 and the surface 4a of the frame 4, i.e. the abutment 3 is pressed against the frame 4 so that the engagement surface 3a of the abutment 3 and the surface 4a of the frame 4 (frame surface) are in contact/engaged. This position may be considered as the first position.

Figure 13C:
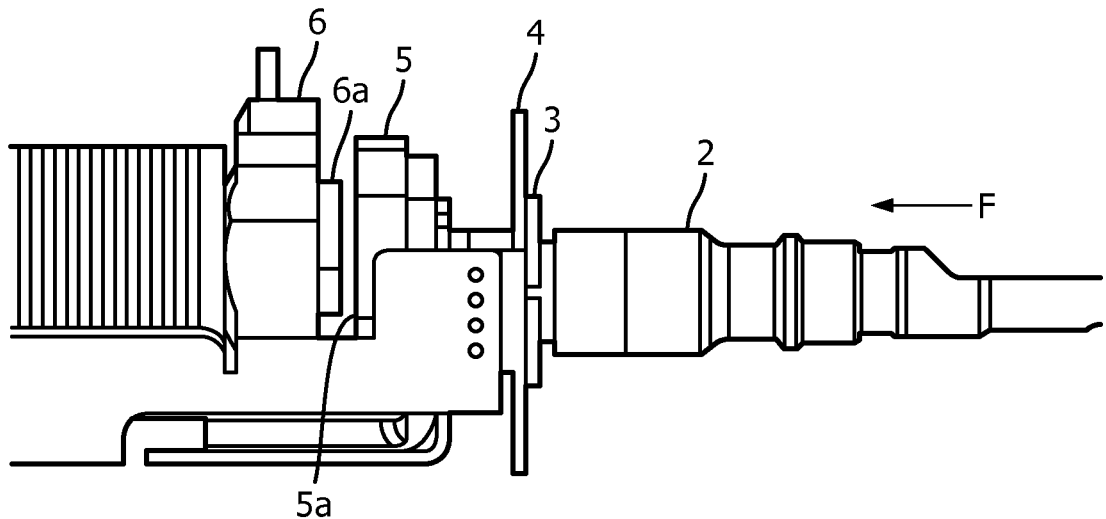

As shown in FIG. 13c, a predetermined preloading force F is then applied to the shaft 2 in the given (axial/longitudinal) direction. Due to the compliancy of the drivetrain, the shaft moves slightly backwards in the axial direction. That is, the shaft 2 moves slightly in the given direction. Since the abutment 3 is engaged with the surface 4a of the frame 4, the abutment 3 slides forward relative to the shaft, i.e. the abutment moves along the shaft in a direction opposite to the given direction.

Due to compliancy in the structure and engagement of the abutment 3 and the frame 4, the abutment 3 slides into a position corresponding to the applied force. This position may be considered as the second position. As an example, applied force F may be 50N.

Figure 13D:
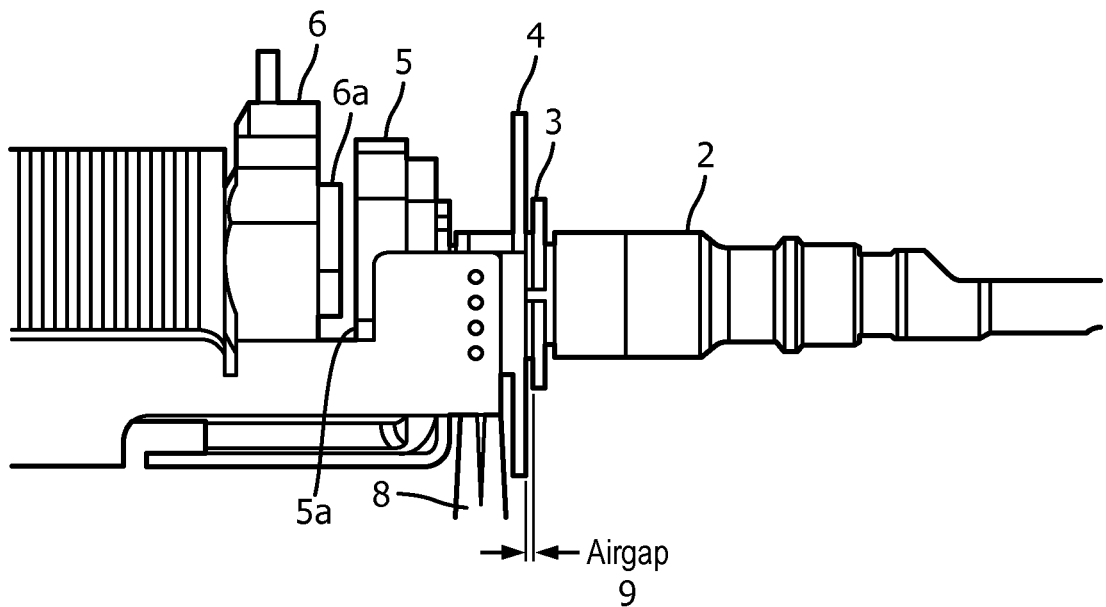

The axial force on the shaft 2 is then released, as depicted in FIG. 13d. Since the shaft 2 is resiliently mounted, it moves forward with respect to the frame 4 when the force is released. That is, the shaft 2 moves in the direction opposite to the given direction to return to its start position or a position close to its start position. The abutment 3 cooperates with the shaft 2 such that it moves with the shaft 2 when it moves in the direction opposite to the given direction. A small airgap 9 is therefore created between the abutment (drop protector) 3 and the frame 4. The abutment 3 remains at the same position on the shaft 2 when the force is released due to the cooperation with the shaft 2. Thus it may be considered that the abutment 3 remains at the second position.

The abutment 3 is then secured in place on the shaft 2 at the location on the shaft 2, i.e. at the second position, by, for example, laser welds 8. A small airgap 9 remains that is not dependent on assembly tolerances. The only factors that influence the gap are compliancy of the drivetrain and preloading force applied during step (3). As an example, a gap of 0.2 mm between the abutment 3 and the frame 4 may occur when the force is released.

The rotor 5 comprises a rotor surface 5a and the stator 6 comprises a stator surface 6a, which is disposed opposite the rotor surface 5a. A distance is defined between the rotor surface 5a and the stator surface 6a. This distance may be greater than the threshold distance, such that movement of the shaft 2 relative to the frame 4 is inhibited before the distance between the rotor surface 5a and the stator surface 6a becomes zero. That is, since the shaft 2 is attached to the rotor 5, movement of the shaft 2 in the given direction will cause the rotor 5 to move towards the stator 6 and the distance between the rotor surface 5a and the stator surface 6a will reduce. Since the abutment 3 inhibits movement of the shaft 2 past the threshold distance, the abutment 3 will prevent the rotor 5 from coming into contact with the stator 6, provided that the threshold distance (corresponding to the airgap 9) is less than the distance between the rotor surface 5a and the stator surface 6a.

Accordingly, the method allows for the abutment to be set and fixed at a position corresponding to the predetermined force and the resulting movement of the shaft. Forces that travel through the sensitive parts of the drivetrain will not exceed the magnitude of the predetermined preloading force F. That is, when a force above the predetermined force is applied to the shaft, such as, for example, a drop force, the abutment engages with the frame to prevent further movement of the shaft and to redirect the force through the frame. The predetermined force may be relatively small compared to the maximum load limit of the sensitive parts and so a robust protection mechanism is created.

Figure 14:
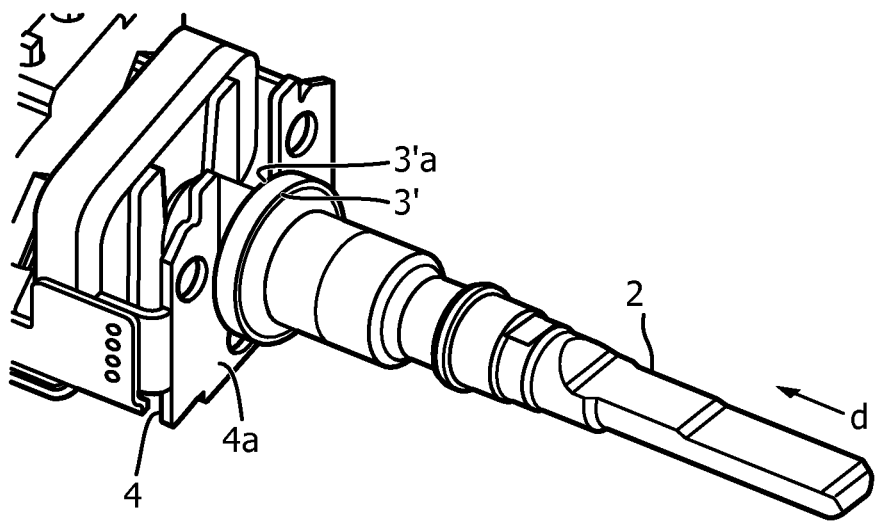
FIG. 14 is a diagram of part of a drivetrain assembly according to an embodiment of an aspect of the invention.

FIG. 14 shows a schematic diagram of part of a drivetrain assembly according to an embodiment of an aspect of the invention. The drivetrain assembly of FIG. 14 shows an arrangement in which the abutment 3' is provided as a widening of the shaft 2. More specifically, a portion of the shaft 2 is wider than the opening of the frame 4 through which the shaft 2 extends such that the wider part of the shaft 2 provides the abutment 3'. Thus the wider part of the shaft 21=comprises an engagement surface 3'a configured to engage with the surface 4a of the frame 4. A gap is provided between the engagement surface 3'a of the abutment 3' and the surface 4a of the frame 4. The gap corresponds to the threshold distance and the shaft 2 is able to move in the given direction d for the threshold distance, before further movement is inhibited by the engagement of the abutment 3' and the frame 4. Since the abutment 3' is provided as part of the shaft 2, the threshold distance is determined by the positioning of the shaft 2 with respect to the frame 4. Thus, the shaft 2 may be positioned during the manufacturing process to provide the desired gap.

Figure 15:
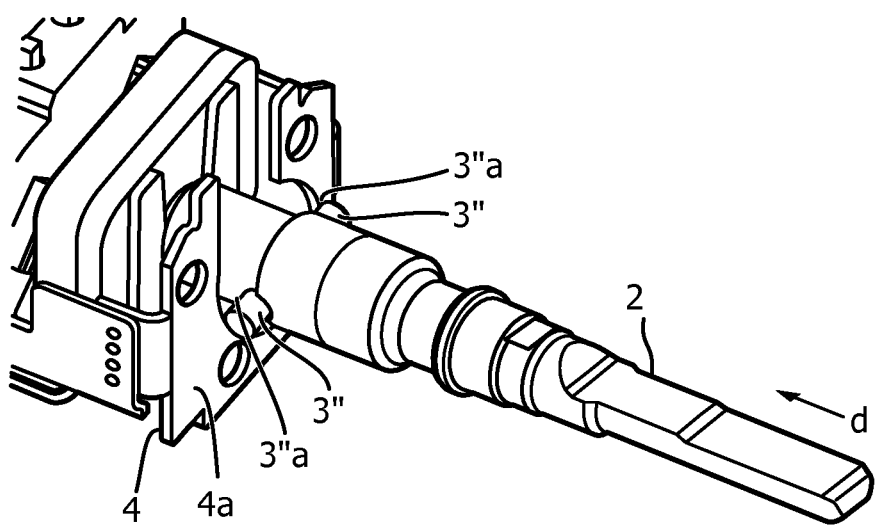
FIG. 15 is a diagram of part of a drivetrain assembly according to an embodiment of an aspect of the invention.

FIG. 15 shows a schematic diagram of part of a drivetrain assembly according to an embodiment of an aspect of the invention. The drivetrain assembly of FIG. 15 shows an arrangement in which the abutment 3" is provided as projections extending from the shaft 2. The projections protrude from the surface of the shaft 2 such that they extend beyond the opening of the frame 4 through which the shaft 2 extends and the wider part of the shaft 2 provides the abutment 3". Thus each of the projections extending from the shaft 2 comprises an engagement surface 3"a configured to engage with the surface 4a of the frame 4. Although two projections are shown in FIG. 15, the shaft 2 may comprise only one projection or more than two projections. A gap is provided between the engagement surface 3"a of each projection of the abutment 3" and the surface 4a of the frame 4. The gap corresponds to the threshold distance and the shaft 22 is able to move in the given direction d for the threshold distance, before further movement is inhibited by the engagement of the abutment 3" and the frame 4. Since the abutment 3" is provided as part of the shaft 2, the threshold distance is determined by the positioning of the shaft 2 with respect to the frame 4. Thus, the shaft 2 may be positioned during the manufacturing process to provide the desired gap.

Figure 16:
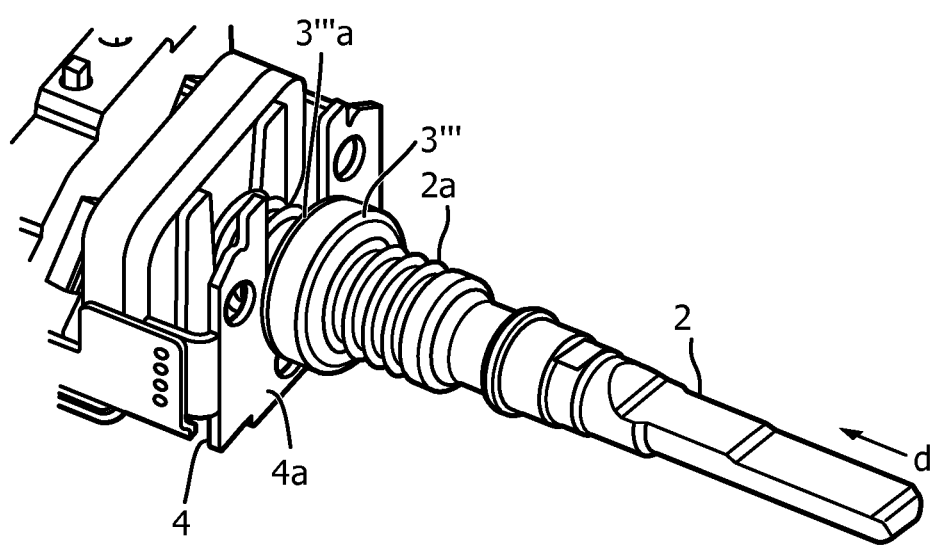
FIG. 16 is a diagram of part of a drivetrain assembly according to an embodiment of an aspect of the invention.

FIG. 16 shows a schematic diagram of part of a drivetrain assembly according to an embodiment of an aspect of the invention. The drivetrain assembly of FIG. 16 shows an arrangement in which the abutment 3''' is provided as a threaded collar, washer or nut configured to engage with a corresponding threaded portion 2a of the shaft 2. More specifically, a portion 2a of the shaft 2 is threaded such that the threaded inner surface of the abutment 3''' engages with the threads 2a of the shaft 2 and the abutment 3''' may be screwed (rotated) onto the shaft 2 to a desired position. The abutment 3''' is wider than the opening of the frame 4 through which the shaft 2 extends and the abutment 3''' comprises an engagement surface 3'''a a configured to engage with the surface 4a of the frame 4.

A gap is provided between the engagement surface 3'''a of the abutment 3''' and the surface 4a of the frame 4. The gap corresponds to the threshold distance and the shaft 2 is able to move in the given direction d for the threshold distance, before further movement is inhibited by the engagement of the abutment 3''' and the frame 4. Since the abutment 3''' is screwed onto the shaft 2, the gap may be set and adjusted by screwing (rotating) the abutment 3''' into position. Thus, the shaft 2 may be positioned during the manufacturing process to ensure that the threaded portion 2a coincides with the opening of the frame 4, and the abutment 3''' may be screwed onto the shaft 2 to a position at which the distance between the engagement surface 3'''a and the surface 4a of the frame 4 corresponds to the desired gap. The gap may be adjusted by screwing or unscrewing the abutment 3''' so as to adjust the position of the abutment 3''' on the shaft 2.

As may be seen from the above, embodiments of the present invention may provide a drivetrain assembly and manufacturing method that includes drop protection. The drivetrain assembly and manufacturing method may be utilised in a personal care device, such as a power toothbrush. Embodiments of the present invention may overcome disadvantages of the prior art discussed above.

Although only a few exemplary embodiments have been described in detail above, those skilled in the art will readily appreciate that many modifications are possible in the exemplary embodiments without materially departing from the novel teachings and advantages of the embodiments of the present disclosure. The above-described embodiments of the present invention may advantageously be used independently of any other of the embodiments or in any feasible combination with one or more others of the embodiments.

Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

In addition, any reference signs placed in parentheses in one or more claims shall not be construed as limiting the claims. The word "comprising" and "comprises," and the like, does not exclude the presence of elements or steps other than those listed in any claim or the specification as a whole. The singular reference of an element does not exclude the plural references of such elements and vice-versa. One or more of the embodiments may be implemented by means of hardware comprising several distinct elements. In a device or apparatus claim enumerating several means, several of these means may be embodied by one and the same item of hardware. The mere fact that certain measures are recited in mutually different dependent claims does not indicate that a combination of these measures cannot be used to an advantage.

The invention claimed is:

1. A drivetrain assembly for a personal care device, the drivetrain assembly comprising:
   a shaft;
   a frame comprising an exterior surface at a distal end of the frame, the exterior surface having an opening through which the shaft extends;
   an abutment exterior to the frame and coupled to the shaft, wherein the abutment includes an engagement surface facing the exterior surface of the frame through which the shaft extends and the abutment is configured to engage with the exterior surface of the frame such that relative movement between the frame and the shaft in a given direction is inhibited past a threshold distance;
   wherein the abutment is arranged on the shaft relative to the exterior surface of the frame so as to provide an airgap between the engagement surface of the abutment and the exterior surface of the frame, and the airgap corresponds to the threshold distance allowing the shaft to move in the given direction by the threshold distance to close the airgap;
   wherein the abutment is a collar including a main body with an inner diameter corresponding to the diameter of the shaft and an outer diameter corresponding to the width of the opening of the exterior surface of the frame, and an engagement portion configured to project from the main body and to provide the engagement surface of the abutment; and
   wherein the opening of the exterior surface of the frame is configured to receive the main body of the collar.

2. The drivetrain assembly of claim 1, wherein the given direction is along a longitudinal axis of the shaft.

3. The drivetrain assembly of claim 1, comprising:
   a motor comprising a rotor and a stator, wherein
   the rotor comprises a rotor surface;
   the stator comprises a stator surface which is disposed opposite the rotor surface; and
   the threshold distance is less than the distance between the stator surface and the rotor surface.

4. The drivetrain assembly of claim 1, wherein the threshold distance corresponds to a predetermined force applied to the shaft in the given direction.

5. The drivetrain assembly of claim 1, wherein
   the shaft and the abutment are configured to jointly move between a primary position and a secondary position relative to the frame;
   the engagement surface of the abutment and the surface of the frame are not in engagement at the primary position;
   the engagement surface of the abutment and the surface of the frame are in engagement at the secondary position; and
   the threshold distance corresponds to the distance between the engagement surface of the abutment and the surface of the frame at the primary position.

6. The drivetrain assembly of claim 1, wherein the abutment is fixed to the shaft.

7. The drivetrain assembly of claim 1, wherein the threshold distance is 0.2 mm or less.

8. A personal care device comprising the drivetrain assembly of claim 1.

9. A method of manufacturing a drivetrain assembly for a personal care device, the method comprising:
   resiliently mounting a shaft in a frame of the drivetrain assembly such that the shaft extends through an opening in an exterior surface at a distal end of the frame;
   placing an abutment in movable engagement with the shaft at a first position on the shaft which is exterior to the frame such that an engagement surface of the abutment is in engagement with the exterior surface of the frame;
   applying a predetermined force to the shaft in an axial direction along a longitudinal axis of the shaft such that the shaft moves relative to the frame in the given direction and the abutment moves to a second position on the shaft due to engagement of the engagement surface of the abutment and the exterior surface of the frame;
   releasing the predetermined force applied to the shaft such that the shaft moves relative to the frame in a direction opposite to the given direction and the abutment moves with the shaft such that the abutment remains at the second position on the shaft and the engagement surface of the abutment is no longer in engagement with the exterior surface of the frame;

fixing the abutment to the shaft at the second position so that an airgap is provided between the engagement surface of the abutment and the exterior surface of the frame, and the airgap corresponds to a threshold distance allowing the shaft to move in the axial direction by the threshold distance to close the airgap;

wherein the abutment is a collar including a main body with an inner diameter corresponding to the diameter of the shaft and an outer diameter corresponding to the width of the opening of the exterior surface of the frame, and an engagement portion configured to project from the main body and to provide the engagement surface of the abutment; and wherein the opening of the exterior surface of the frame is configured to receive the main body of the collar.

10. The method of claim 9, wherein the abutment is fixed to the shaft at the second position by laser welding.

11. The method of claim 9, wherein the predetermined force is 50 N or less.

12. A personal care device comprising:

a handle;

a shaft extending outward from the interior of the handle;

a frame in the interior of the handle and having an exterior surface at a distal end of the frame through which the shaft extends;

an abutment coupled to the shaft at a location along the shaft which is inside the handle and exterior to the frame;

wherein the abutment includes an engagement surface facing the exterior surface of the frame and configured to engage with the exterior surface of the frame so as to provide an airgap between the engagement surface of the abutment and the exterior surface of the frame, and, when the air gap is closed, transfers a force applied to the shaft through the frame.

* * * * *